US006693557B2

(12) United States Patent
Arnold et al.

(10) Patent No.: US 6,693,557 B2
(45) Date of Patent: Feb. 17, 2004

(54) VEHICULAR TRAFFIC SENSOR

(75) Inventors: David V. Arnold, Provo, UT (US);
Logan Harris, Linden, UT (US);
Michael Jensen, Linden, UT (US);
Thomas William Karlinsey, Orem, UT (US); Ryan Smith, Salem, UT (US);
Jonathan L. Waite, Orem, UT (US);
John B. Dougall, Jr., Highland, UT (US)

(73) Assignee: Wavetronix LLC, Provo, UT (US)

( * ) Notice: Subject to any disclaimer, the term of this patent is extended or adjusted under 35 U.S.C. 154(b) by 0 days.

(21) Appl. No.: 09/964,668

(22) Filed: Sep. 27, 2001

(65) Prior Publication Data

US 2003/0058133 A1 Mar. 27, 2003

(51) Int. Cl.[7] .............................. G08G 1/01; H01Q 1/42
(52) U.S. Cl. ........................ 340/933; 340/928; 342/385; 342/450; 342/448; 342/454; 343/720; 343/824; 343/872
(58) Field of Search .................................. 340/933, 928, 340/905; 342/75, 448, 454, 456, 457, 385, 450; 343/872, 824, 844, 841, 842, 720

(56) References Cited

U.S. PATENT DOCUMENTS

| 4,658,334 A | * | 4/1987 | McSparran et al. ......... 361/415 |
| 4,851,855 A | * | 7/1989 | Tsukamoto et al. ......... 343/873 |
| 4,908,615 A | * | 3/1990 | Bayraktaroglu ............. 340/933 |
| 4,914,448 A | * | 4/1990 | Otsuka et al. .............. 343/872 |
| 4,914,449 A | * | 4/1990 | Fukuzawa et al. .......... 343/872 |
| 4,967,201 A | * | 10/1990 | Rich, III ..................... 341/175 |
| 4,977,406 A | * | 12/1990 | Tsukamoto et al. ......... 343/846 |
| 5,262,783 A | * | 11/1993 | Philpott et al. ............. 342/114 |
| 5,423,080 A | * | 6/1995 | Perret et al. .................. 455/90 |
| 5,862,337 A | | 1/1999 | Gray .......................... 395/200 |
| 6,091,355 A | * | 7/2000 | Cadotte, Jr. et al. ........ 342/104 |

OTHER PUBLICATIONS

SmarTek Systems, The SAS–1 Passive Acoustic Vehicle Detector, www.smarteksys.com/sas–1_flyer.htm Sep. 2001.
SmarTek Acoustic Sensor—Version 1 (SAS–1), Installation and Set–Up Guide, Jul. 25, 2000.

\* cited by examiner

Primary Examiner—Donnie L. Crosland
(74) Attorney, Agent, or Firm—Workman Nydegger

(57) ABSTRACT

A vehicle traffic sensor for detecting and monitoring vehicular targets is presented. The sensor employs a planar design resulting in a reduced profile sensor. The sensor includes a multi-layer radio frequency board with RF components on one of the sides and both isolation and planar array antennas on the opposing side. The antennas are preferably tapered planar array antennas which include one transmit antenna and one receive antenna. The sensor also includes at least one logic or signal processing board populated with components on a first side and a ground plane on a second side positioned toward the RF componentry of the RF board to form an RF shield. The boards are housed within a housing that is permeable, at least on the side through which the antenna structures propagate.

27 Claims, 12 Drawing Sheets

VEHICULAR TRAFFIC SENSOR

CROSS-REFERENCE TO RELATED APPLICATIONS

The present application is related to U.S. patent application Ser. No. 09/996,146 "System and Method of Dynamic Identification of Traffic Lane Positions," (Attorney Docket No. 15455.1) by inventors Jonathon L. Waite, Thomas William Karlinsey and David V. Arnold, filed concurrently herewith and incorporated by reference now U.S. Pat. No. 6,556,916.

BACKGROUND OF THE INVENTION

1. The Field of the Invention

The present invention relates generally to vehicular traffic monitoring systems, and more particularly relates to sensors for detecting the presence, location, speed, direction of travel, volume, and occupancy of vehicular traffic on a roadway.

2. The Relevant Technology

Controlled signalized intersections represent a key element in urban planning, public safety and traffic control. The science and engineering of traffic planning and control has long relied on the use of sensor devices designed for this specific purpose and, more recently, for the collection of traffic flow data. Some of these device technologies, such as those embedded in the roadways, have been employed for over sixty years and continue to require the same amount of attention in installation, calibration, maintenance, repair and replacement as they did decades ago. This laborious caretaking can be due to a number of factors ranging from inferior product design and poor installation to post installation disruption and migratory changes in traffic flow patterns. Reliability of these technologies is an issue to an overall traffic control plan and can prove extremely costly to maintain as an integral component to an overall traffic plan.

Traffic control devices that are embedded in roadways serve the interest of public safety, but in the event of a new installation, or maintenance/repair, they act as a public nuisance, as repair crews are required to constrict or close multiple lanes of traffic for several hours to reconfigure a device, or even worse, dig up the failed devices for replacement causing closure of the lane for several days or weeks.

While several sensor technologies are employed to assist in traffic planning and control, the oldest and most widely used technology currently employed in controlled intersections is the inductive loop. This loop is an in-pavement fixed location sensor, with the limitation of sensing only the traffic that is immediately over it. While such devices have continued history of use, failures of loops are common and at any one time as many as 20%–30% of all installed controlled intersection loops are non-responsive. Furthermore, the cost to repair these devices can be greater than the original installation cost.

As technology has developed over the decades, new sensory devices have been introduced to the traffic control industry. In recent years, there have emerged several non-intrusive technologies for traffic sensing that employ a remote sensor (i.e., not embedded in the roadway) as illustrated in FIG. 1. While the majority of these types of sensors 110 incorporate microwave radar technology, other types including optical devices have also taken hold. For example, intersection traffic cameras may be manually configured to analyze specific user-defined traffic zones at all times. As cameras rely on optics, (i.e., the ability to visually see the traffic that is to be monitored) they are susceptible to the forces of nature that can occlude visibility. These forces include sun glare, accumulated snow or dirt and darkness. Under ideal conditions cameras would only need to be serviced or reconfigured with major intersection redesign. Presently available systems require on-site attention to improve and upgrade the capability of the unit, or complete replacement for upgrading the camera itself.

Another type of above-ground sensor includes acoustic sensors which operate as traffic sound-based listening devices. These devices employ an array of microphones built into the sensor allowing the device to detect traffic based on spatial processing changes in sound waves received at the sensor. After processing and analysis of the received sound waves, detection and traffic flow information is then assigned to the appropriate user-defined regions or lane being monitored forming a picture of the traffic.

When acoustic sensors are deployed, their microphone sensitivity is pre-set for normal operating conditions which include typical weather conditions. Again, the software and operating instructions to control an acoustic sensor require on-site attention to improve and upgrade the capability of the unit, or complete replacement to upgrade the sensor itself.

Other popular sensor types are based on microwave radar technology. Such sensors detect traffic based on the reflection of a transmitted electromagnetic signal depicted in FIG. 1 as signals 118. The received signal is then processed into detection and traffic flow information which is then assigned to the appropriate user defined lane being monitored. As illustrated in FIGS. 2 and 3, microwave radar technology utilizes several bulky, expensive and manufacturably inefficient components to sense traffic. Most notably, microwave radar sensors are comprised of a mechanically-large horn antenna 170 and separate radio frequency components and controller boards that are individually tuned and matched in order to result in an operable system 180. Furthermore, the unit requires on-site maintenance and attention to reconfigure, or upgrade software.

As identified above, many useful forms of technology exist to monitor and detect traffic. However, many forms of detection are obtrusively bulky, manufacturing intense, and all require on site maintenance and attention to re-configure the software, or operating instructions when traffic conditions, climate, or other operating conditions change. Without reconfiguration, the devices will continue to sense, but with reduced accuracy and in the worst case they may discard the actual flow pattern as peripheral noise. The cost to manufacture and reconfigure devices can be costly, and disruption to traffic is common.

BRIEF SUMMARY OF THE INVENTION

A vehicle sensor for detecting and monitoring vehicular targets is presented. The sensor employs a planar design resulting in a reduced profile sensor and a greatly improved sensor for manufacturing. Improvements are a result of controlled manufacturing processes for forming controlled interconnects and structures on replicable circuit boards.

The sensor of the present invention includes a multi-layer radio frequency board having a first side which includes at least a majority of the RF components. On the opposing side of the board is a ground plane providing isolation to the RF components. Additionally, the opposing side also has printed thereon array transmit and receive antennas for radiating a signal toward a vehicular target and for receiving the signal as reflected from the vehicular target. The planar antennas provide a replicable antenna structure that is easily manufactured.

The sensor device further includes logic/control functionality which may be colocated or positioned separately on at least one logic or signal processing board that is preferably populated with components on a first side with a ground plane on a second side. The second or ground plane side is preferably positioned toward the RF componentry of the RF board to form an RF shield about the RF componentry. The boards are housed within a housing that is permeable to electromagnetic waves, at least on the side through which the antenna structures radiate. To provide additional RF absorption and isolation, an RF absorber is placed between the boards to provide additional isolation of RF emanations near to the source of generation.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated, in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
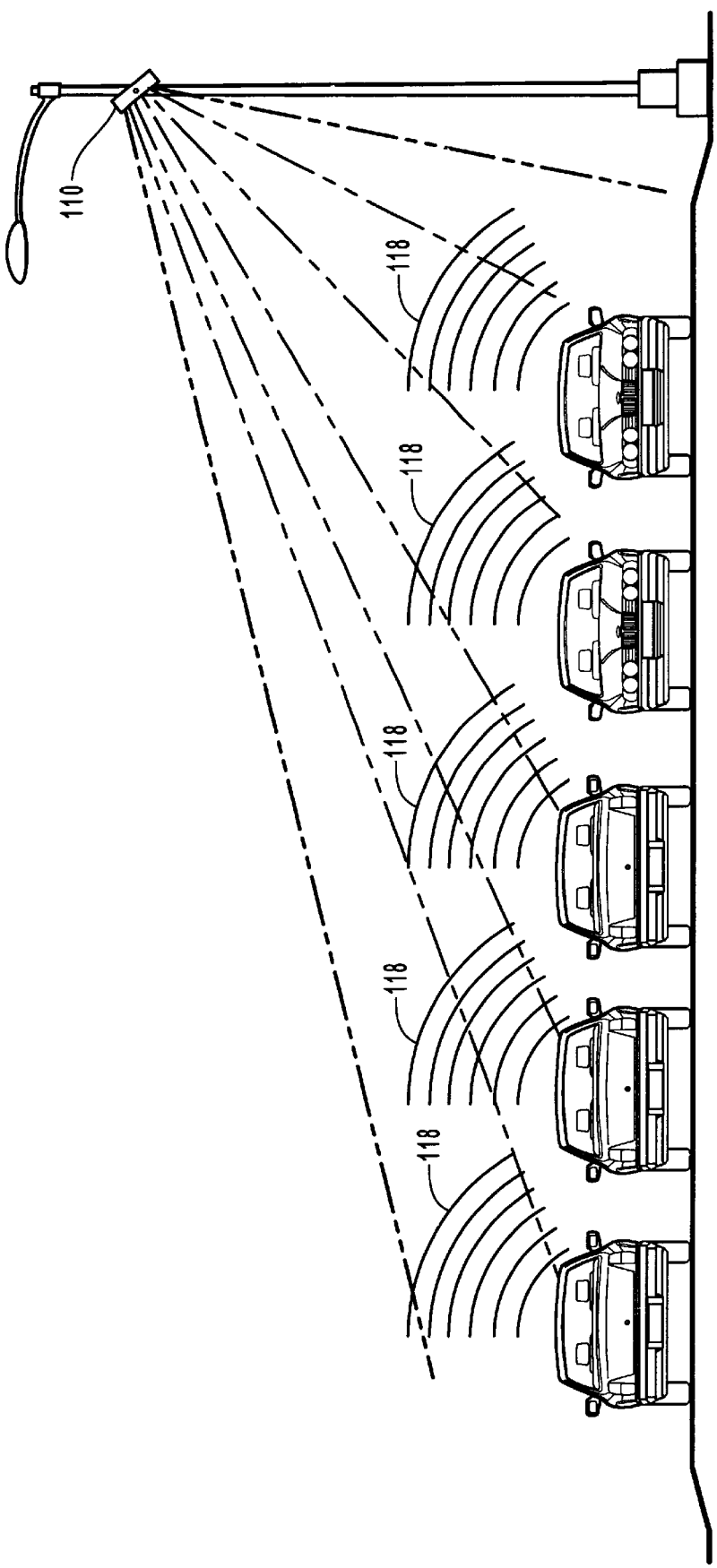
FIG. 1 illustrates an above-ground sensor employing propagation delay calculation for position calculation of vehicular traffic.
Figure 2:
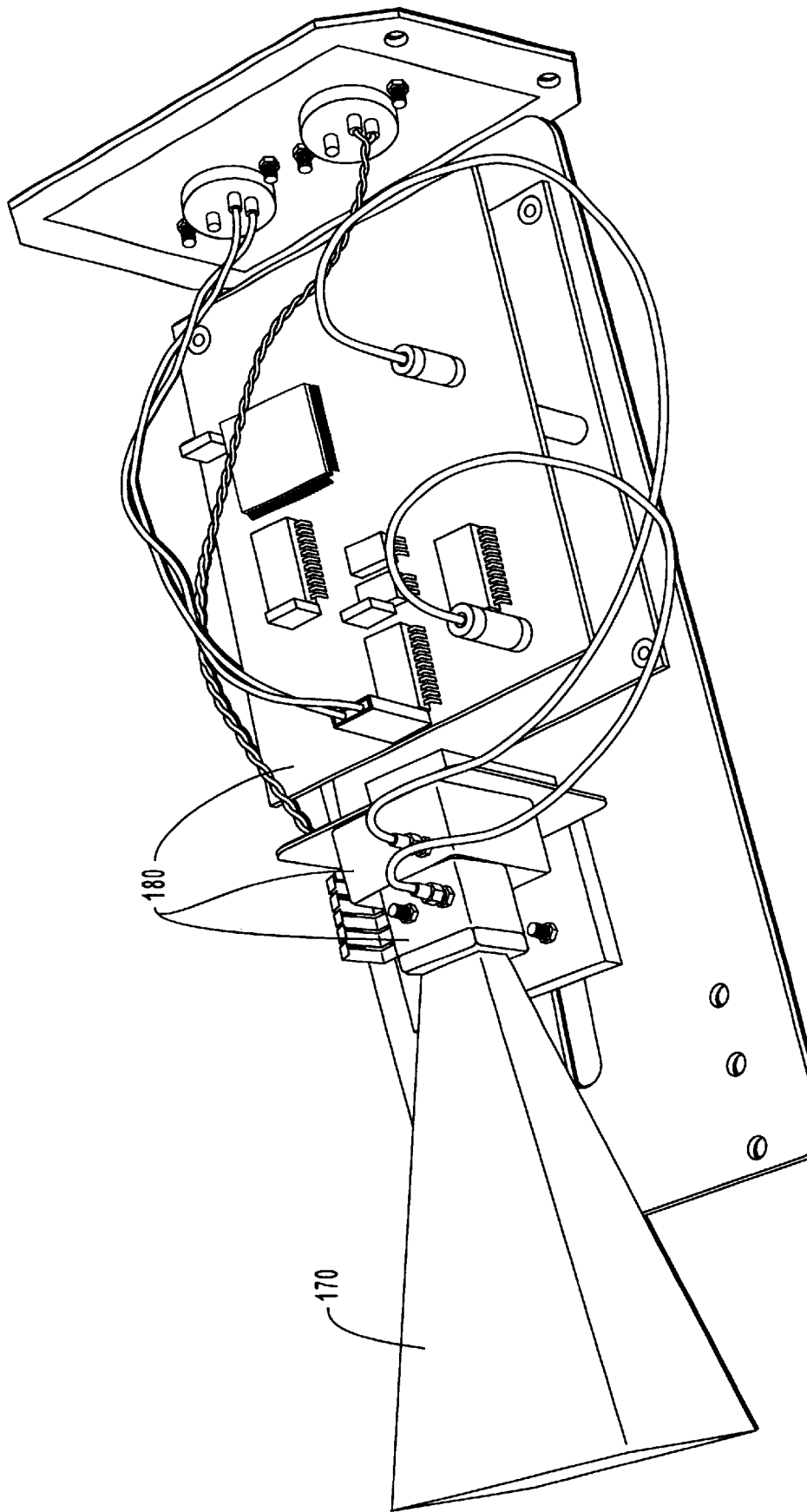
FIGS. 2–3 illustrate a radar sensor comprised of horn antennas and multiple modules, in accordance with the prior art.
Figure 3:
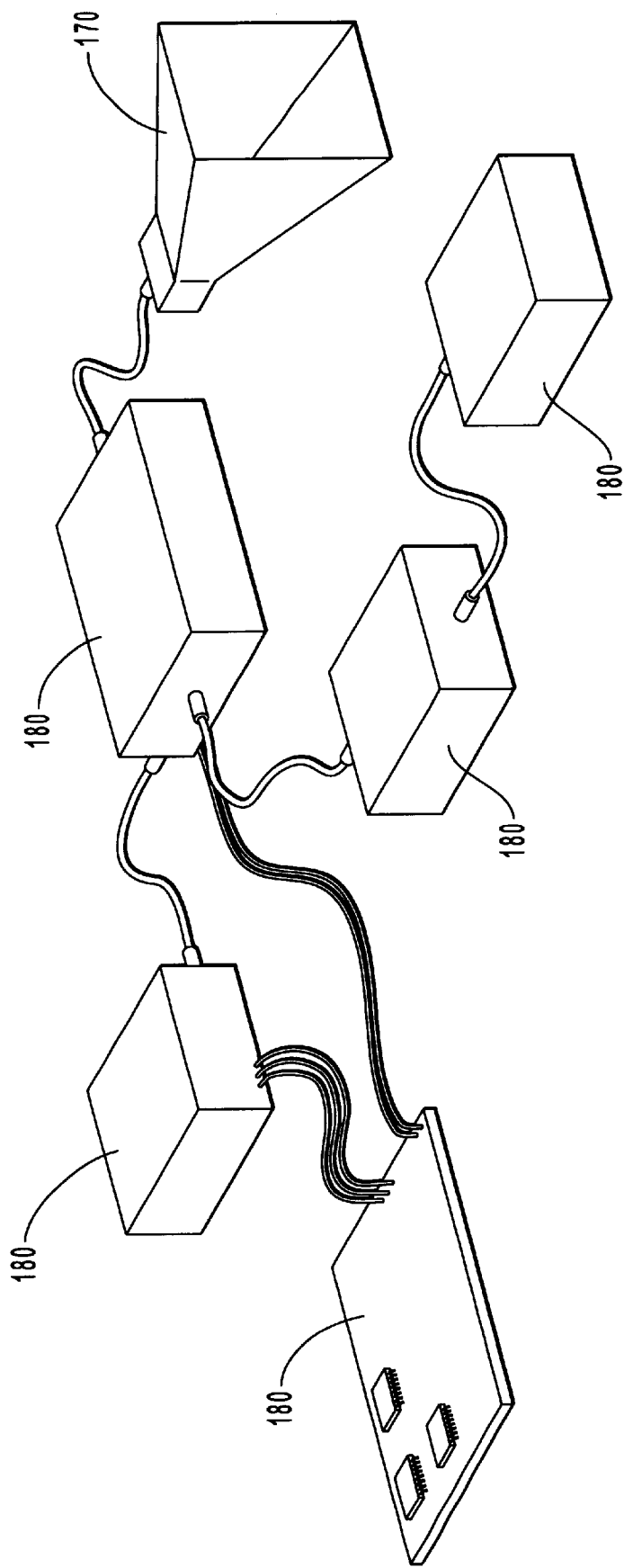
Figure 4:
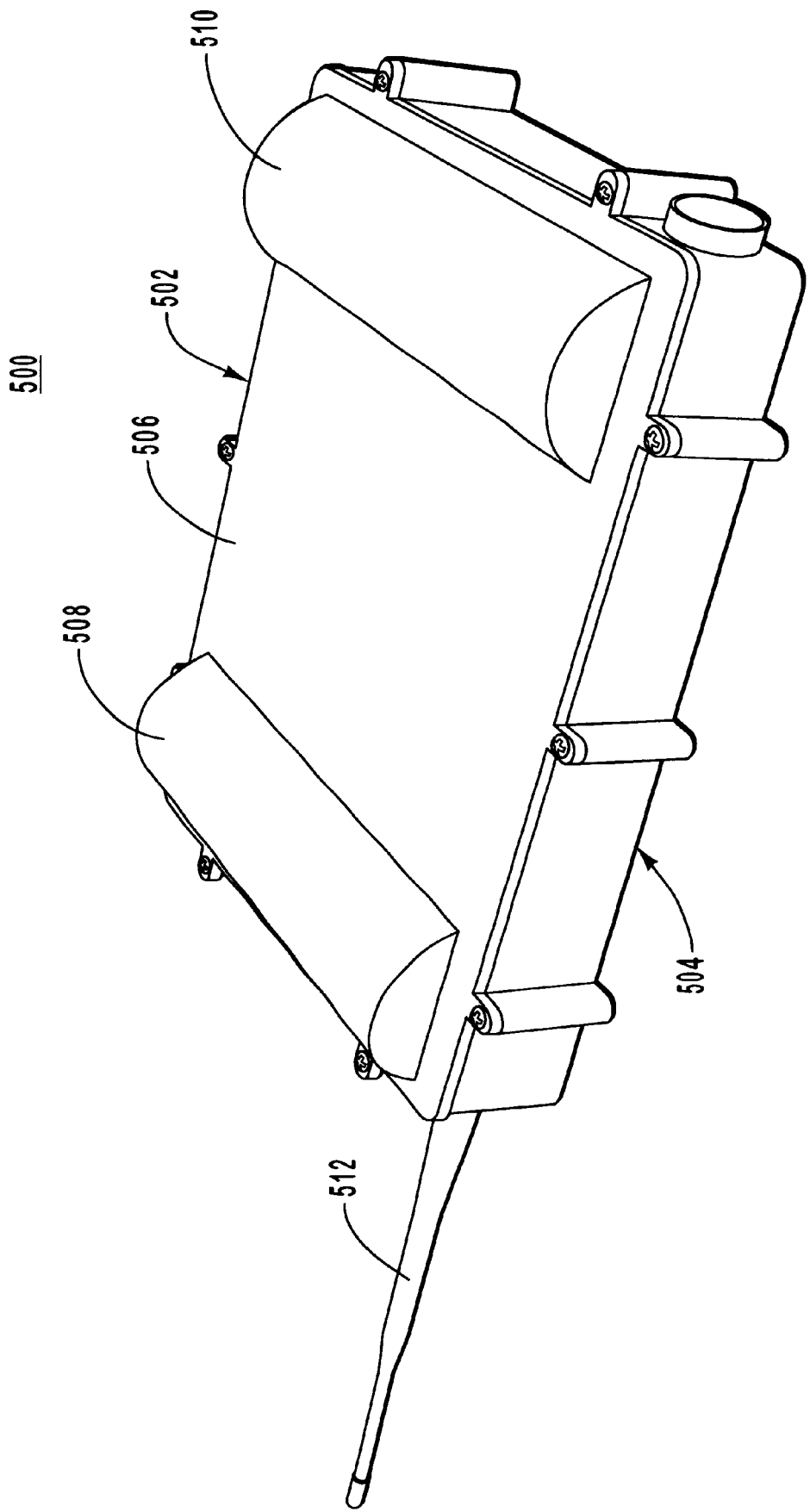
FIG. 4 illustrates an integrated above-ground traffic sensor, in accordance with the preferred embodiment of the present invention.

FIG. 4 is a perspective view of a traffic monitoring sensor, in accordance with a preferred embodiment of the present invention. A sensor 500 is illustrated having a generally planar topology due to the planarization of components including planarization of a transmit and receive antenna. Sensor 500 is a generally sealed enclosure comprised of a material that is permissive to the exchange of electromagnetic propagations. Sensor 500 is also generally comprised of a housing 502 for enclosing the multi-layer radio frequency circuit board and other processing component boards such as digital signal processing and/or control assemblies. Housing 502 includes a back surface 504 and a top or front surface 506. During deployment of sensor 500, front surface 506 is directed generally orthogonal with the roadway or portion of roadway undergoing monitoring. In the present invention, the term "above-ground" sensor means that the sensor is not embedded into the roadway but rather may be mounted above or about the roadway at various acceptable angles.

As the electromagnetic signals must propagate through front surface 506 as radiated from planar printed circuit board antennas described below, front surface 506 further includes geometries that facilitate reduced distortion of the antenna radiation pattern throughout the entire beamwidth of the antennas. FIG. 4 depicts such distortion-minimizing geometries as radomes 508 and 510.

FIG. 4 further depicts additional sensor enhancements which are structurally depicted as communication link antenna 512 which facilitates both transmission of accumulated sensor data as well as reception of commands and software upgrades. The power and serial communication link are facilitated through the connector 514.

Figure 5:
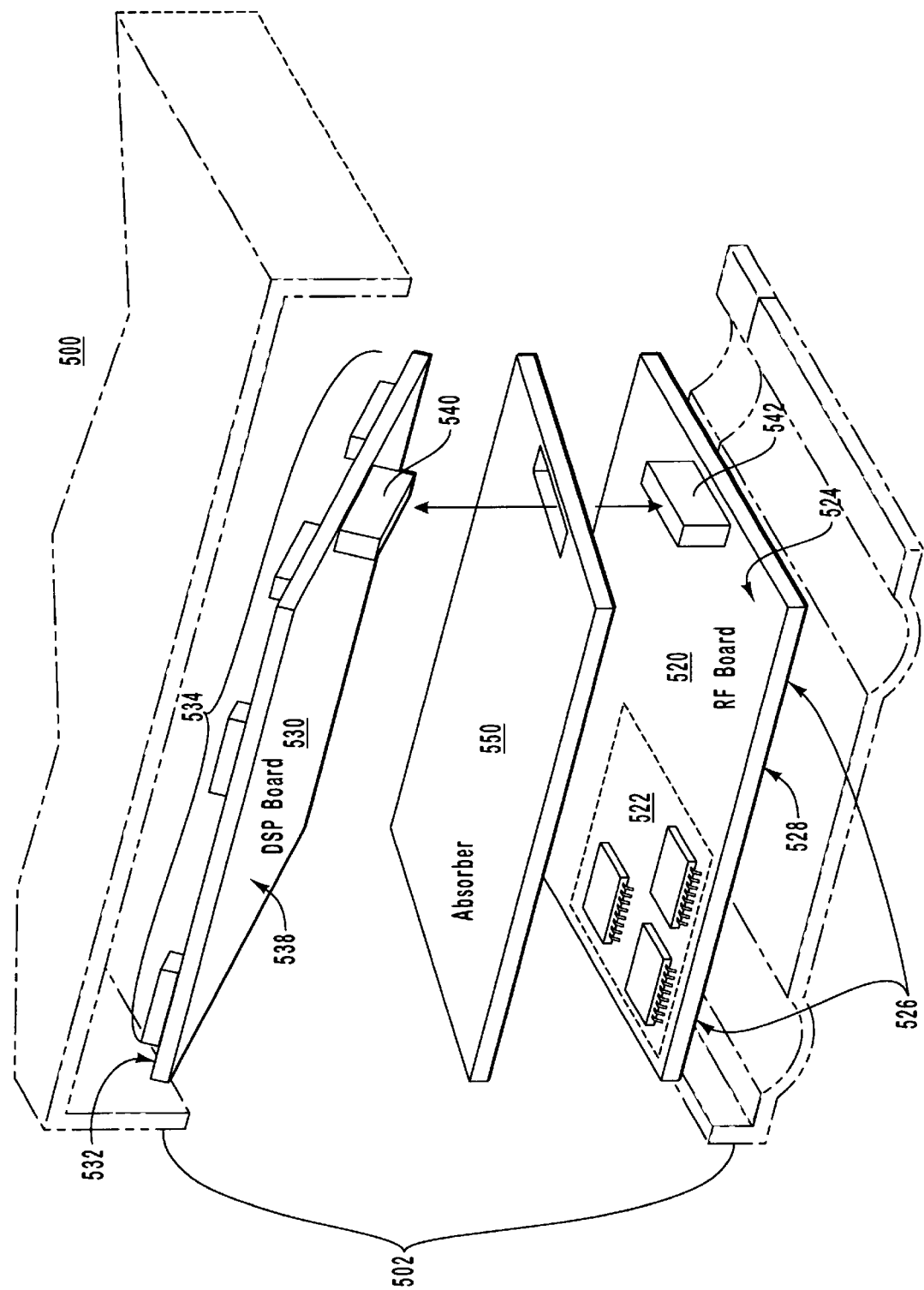
FIG. 5 illustrates the mechanical integration of RF components and signal processing components, in accordance with the preferred embodiment of the present invention.

FIG. 5 illustrates an exploded view of sensor 500, in accordance with the preferred embodiment of the present invention. In addition to including housing 502, sensor 500 further includes a multi-layer radio frequency circuit board 520 which includes radio frequency components 522 disposed on a first side 524. Circuit board 520 further includes antennas 526 on an opposing second side 528. Such a configuration accommodates an integrated and efficient topology of a sensor since bulky horn antennas are not employed. Furthermore, the integration of radio frequency components onto a planar circuit board arrangement having the antenna also disposed thereon dramatically improves manufacturability.

Sensor 500 further includes at least one controller/signal processing circuit board 530 having a first side 532 for disposing signal processing component 534 thereon and a second side having an electrically conductive ground layer 538. Electrically conducted ground layer 538 functions as an RF shield when it is oriented in parallel and facing multi-layer radio frequency circuit board 520 upon final assembly within housing 502. Ground layer 538 also functions as a ground plane for the controller/signal processing circuit board. Signal processing board 530 and radio frequency circuit board 520 interact via connectors 540 and 542, respectively.

Sensor 500 further comprises an absorber 550 located between multi-layer radio frequency circuit board 520 and signal processing board 530. Absorber 550 comes into proximity of both the electrically conductive ground layer 538 on board 530 and the first side 524 having RF components 522 thereon of radio frequency circuit board 520. In order to minimize the disturbance of the desired electromagnetic fields in the RF structures about and interconnecting RF components 522, channels or cutouts preferably extending only partially into absorber 550 are incorporated within absorber 550 that provide clearance around such RF components including transmission lines located on first side 524 of radio frequency circuit board 520.

Figure 6:
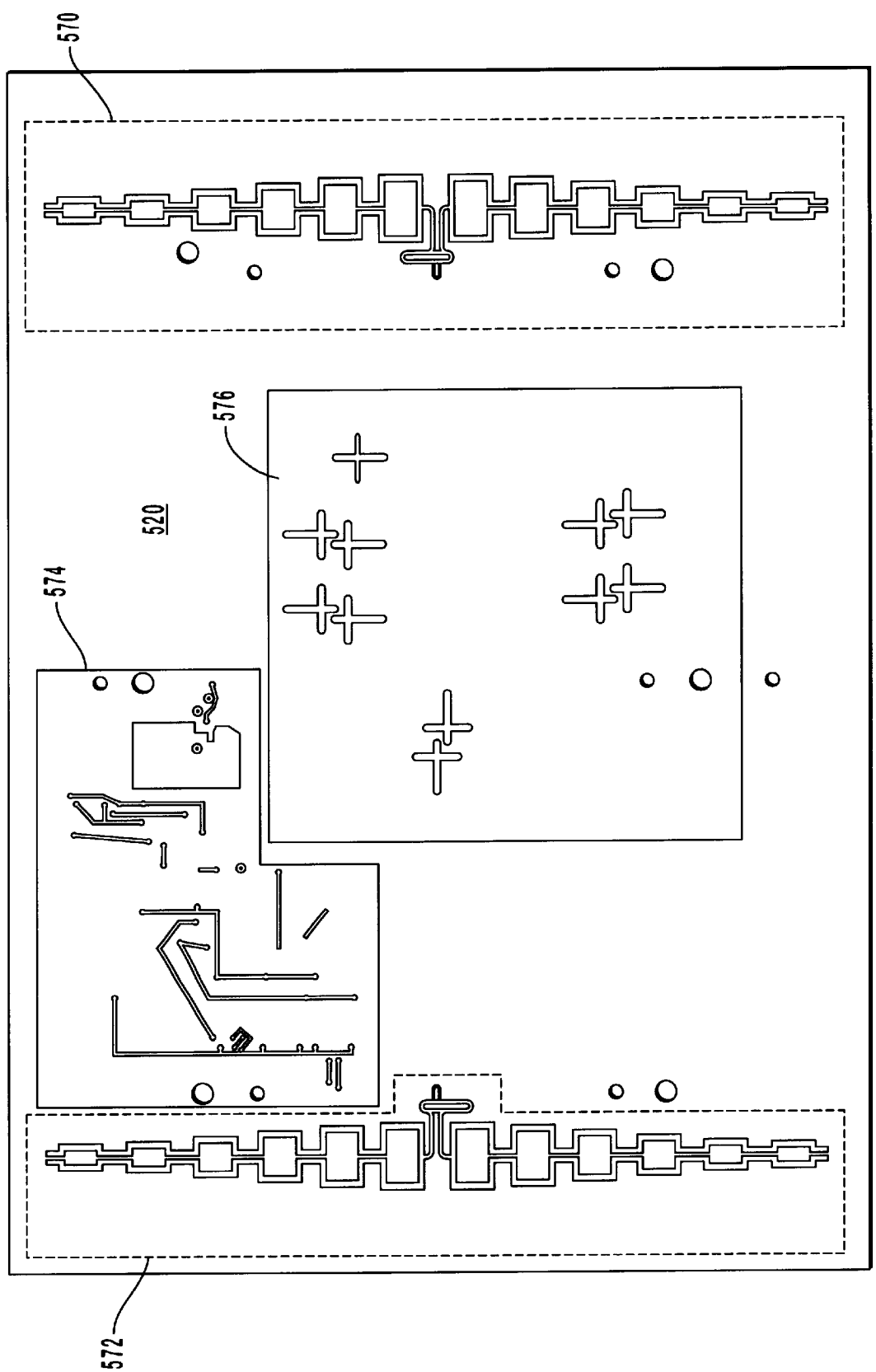
FIG. 6 illustrates planar antennas integrated into the RF module board, in accordance with the preferred embodiment of the present invention.

FIG. 6 illustrates an exemplary layout of second side or antenna side 528 of multi-layer radio frequency circuit board 520. The antenna system of the present invention is placed on the same circuit board as the other RF circuitry. The antenna system includes two coplanar loop series-fed array antennas 570 and 572 that are preferably located on opposite ends of RF circuit board 520 and on the opposite side of the circuit board from RF circuitry components 522. Thus, in the preferred embodiment, one side of the circuit board includes antennas 570 and 572 with possibly DC interconnect lines 574 miscellaneous bias networks 576 while side 524 includes RF components 522.

Figure 7:
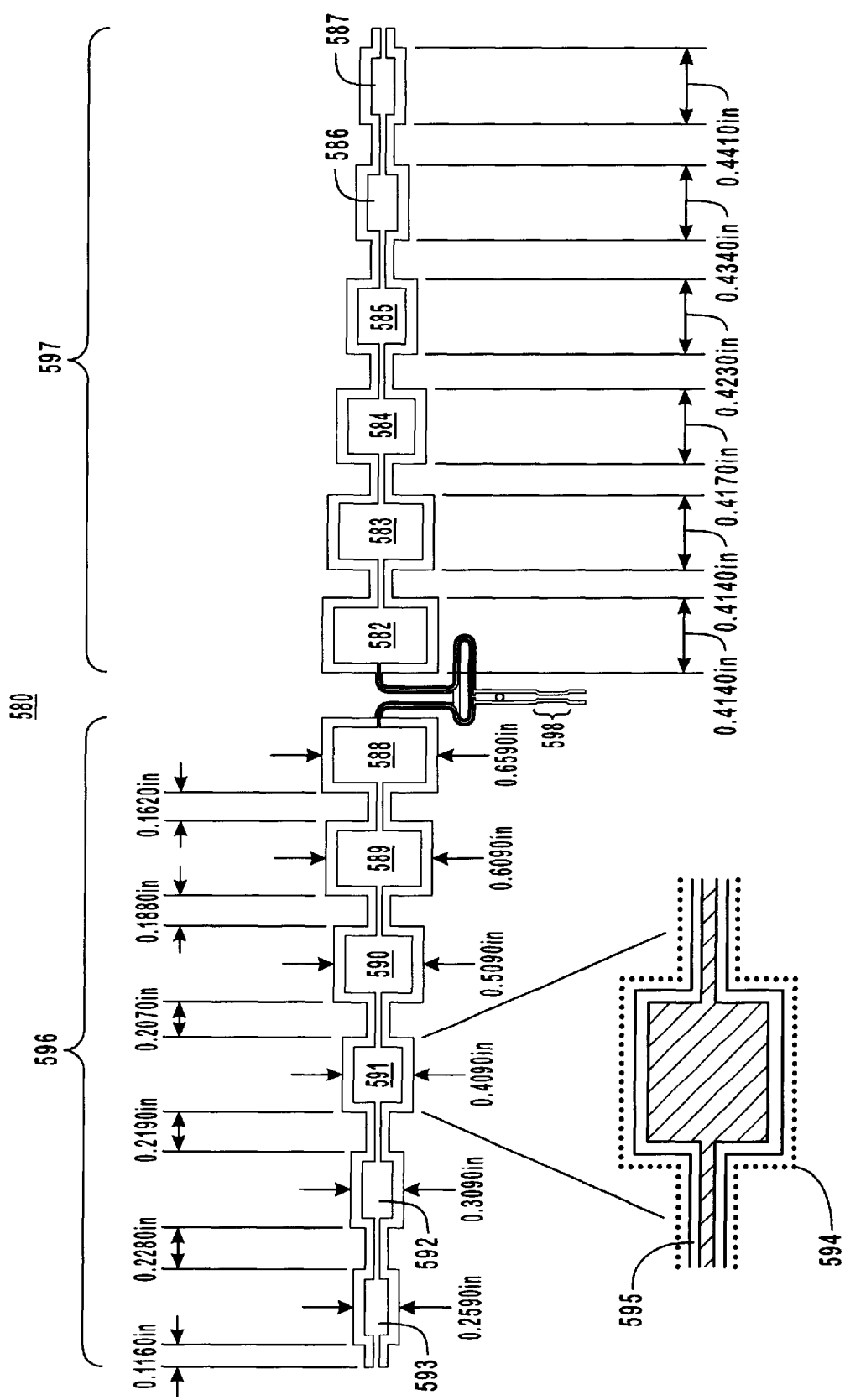
FIG. 7 is a detail of one of the planar antennas, in accordance with a preferred embodiment of the present invention.

FIG. 7 illustrates a detailed layout of a planar printed circuit board antenna, in accordance with a preferred embodiment of the present invention. The present invention utilizes a coplanar waveguide loop antenna 580 for radiating and receiving microwave signals projected about a vehicular target. The present configuration employs a series of radiating elements. In the present implementation, areas of metal are surrounded by slots or areas with no metal. This structure can be implemented by surrounding the metal with air, or by printing it on a dielectric substrate, or on a conductor backed dielelectric substrate. This is a non-resonant element that exhibits many desirable properties such as wide bandwidth, and a low coupling between adjacent elements. The radiation from this element is polarized horizontally as oriented in FIG. 7. In a conductor backed implementation, the elements radiate only out of the page.

FIG. 7 depicts an array of series fed coplanar loop elements 582–587 and 588–593. In the present invention, the coplanar waveguide traveling wave series loop antenna element exhibits the broadband qualities of a traditional coplanar loop and can be combined in a series like the series fed microstrip patch. For an appreciation of related structures, the following articles are incorporated herein by reference: H. C. Liu, T. S. Horng, and N. G. Alexopoulos, "Radiation of Printed Antennas with Coplanar Waveguide Feed," IEEE Trans. Antennas Propgat., vol. 43 no. 10, pp. 1143–1148, October 1995; and A. G. Demeryd, "Linearly Polarized Microstrip Antennas," IEEE Trans. Antennas Propogat., pp. 846–851, November 1976.

In the present invention, since the coplanar series loop is not a resonant element, the size of the element can be readily adjusted. This size adjustment results in an alteration to the amount of radiation exhibited. Thus, tapered arrays can be designed by utilizing radiating elements with varying sizes. The coplanar waveguide series loop element is implemented using the following features: a conductor backed dielectric substrate 704, 702 (see FIG. 9), grounding vias 594 to prevent substrate propagation, and wide coplanar slots 595 to reduce the effects of manufacturing variations.

The use of a conductor backed dielectric substrate limits the radiation from the element to only one side of the element and also facilitates manufacturing as the element can be printed on a dielectric laminated with metal on both sides. The grounding vias 594 prevent the propagation of parallel plate modes that may exist when dielectric is laminated on both sides by metal. These parallel plate modes could cause coupling between radiating elements printed on the same substrate and could cause unpredictable antenna input impedances.

The wide coplanar slots 595 help in several ways. First, wide coplanar slots increase radiation and increase tolerance to manufacturing variations. Second, circuit boards are often coated with solder mask and conformal coating to protect the board and components. These coatings, however, fill the coplanar slots and cause unpredictable phase shifts. The widening of the coplanar slots reduces this effect. By way of example and not limitation, slots 595 in the preferred embodiment assume a width of 60 mils. which provides the needed tolerance to manufacturing and coating variations but also maintains the necessary coplanar properties. The width of the center conductor of the coplanar waveguide is chosen to achieve the desired transmission line characteristic impedance.

The detail of FIG. 7 illustrates vias 594, that in a preferred embodiment are plated with copper to create a grounded short between the top ground plane and the bottom ground plane. In the present example, vias 594 are placed so that the edge of the via is 25 mil from the edge of the slot which is sufficient to result in marginal influence to the transmission line characteristics but sufficiently close to effectively channel the electromagnetic energy.

A tapered antenna array 596, 597 may be implemented through the use of varying element sizes. Series-fed arrays, such as this one in the present example, are used to replace corporate feed designs in which each element is fed by its own individual transmission line. The corporate feed approach requires an intricate feed structure that becomes more complicated when different antenna elements are used in the array or when a tapered feed is desired. Furthermore, corporate feed structures are prone to undesired radiation which results in antenna pattern distortion.

The exemplary loop dimensions given on FIG. 7 illustrate the heights of the loops and tapering towards the edges of the array. The radiating edges of the loops are the vertical sides (as oriented in FIG. 7). Thus, variations in the height of the loop results in changes to the degree of radiation from the loop. Consequently, the tapering of the loop size results in a radiation power distribution that creates a radiation pattern with low side lobes. The dimensions shown on the array 597 illustrate the loop widths increasing towards the edges of the array. This ensures that the radiating edges of the loop are in-phase. This dimension results in the widths being larger as the heights are smaller. The exact loops dimensions were determined through simulation.

The lengths of transmission lines between the loops illustrated on array 596 are adjusted to facilitate every loop radiating in phase. As shown, these lengths are longer for smaller loops. These lengths are again determined from simulation. As illustrated in FIG. 7, the left half of the array 596 is fed from the right and the right half of the array 597 is fed from the left. This would cause an 180° phase shift between the two sides of the array 580 if not compensated for. Since the transmission lines which feed the two sides of the array are of different lengths, the line as illustrated on the right is exactly ½ wavelength longer than the line on the left. This provides the compensation to achieve in-phase radiation from both sides of the array.

In the present example, the antenna 580 is fed from a 50 Ω transmission line that drives two 100 Ω lines, which intersect at a tee. From the tee to the edges of the array, the transmission lines are 100 Ω. Notice that the 50 Ω transmission line feeding the antenna narrows for a section 598 and then returns to the standard width. This section 598 of the line is a quarter-wave matching section used to provide an impedance match to antenna 580. The ends of the array are terminated by short-circuited transmission lines. This termination causes a standing wave pattern throughout the antenna and causes the antenna as a whole to become a resonant structure. This has an advantage over a matched termination in that the antenna gain is higher since there are no losses in the termination. If a higher bandwidth antenna is needed, however, a matched termination, which would result in a traveling wave antenna, may be employed.

Figure 8:
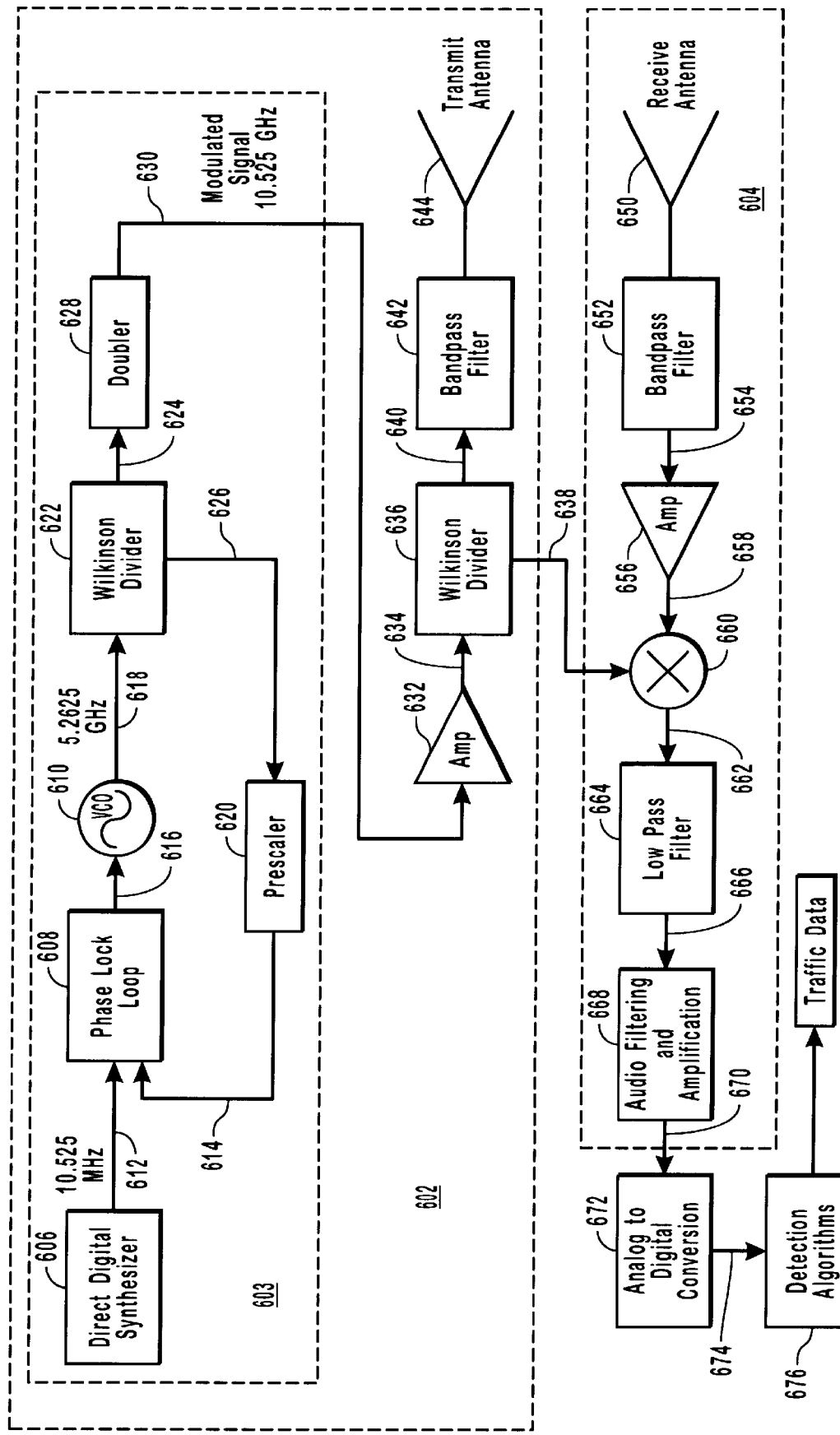
FIG. 8 is a block diagram of the component side of the RF board assembly and other related functional blocks, in accordance with the present invention.

FIG. 8 is a functional block diagram of the radio frequency circuit board with other blocks of related functionality, in accordance with a preferred embodiment of the present invention. The functionality of radio frequency circuit board 520 (FIG. 5) may be partitioned into a transmit portion 602, including a digitally generated modulated signal generator 603, and a received portion 604. Transmit portion 602 is comprised, in the preferred embodiment, of a direct digital synthesizer (DDS) 606 for creating a signal 612 that sweeps in frequency.

While the present embodiment depicts frequency generation using a DDS, it is also contemplated that other waveform generating devices, generally herein known as digitally generated modulated signal generators, including numerically controlled devices, may be employed for generating effective waveforms In the preferred embodiment, a modulated signal is generated digitally and is thus phase-locked to a digital clock. This modulated signal is then up-converted, if necessary, to the desired band.

Figure 10:
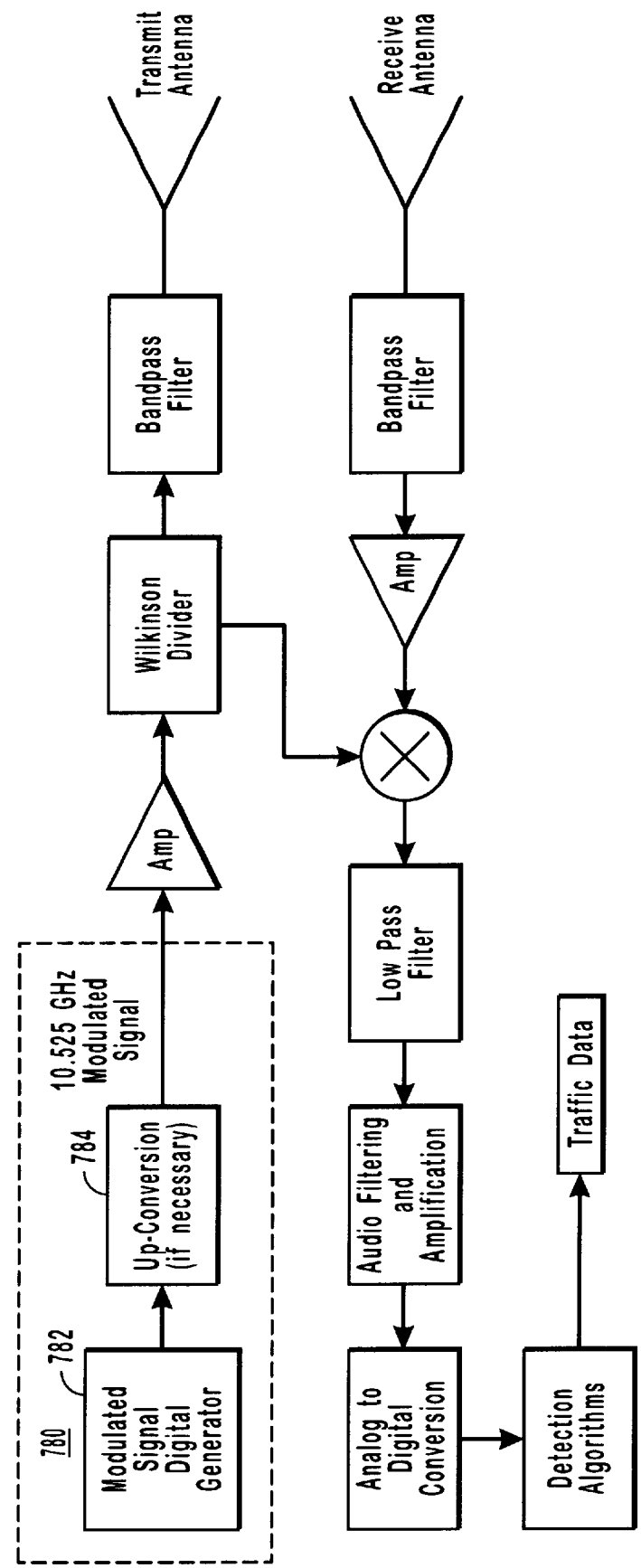
FIG. 10 illustrates an embodiment of the present invention that employs a modulated signal digital generator for generating the desired signal.

Various embodiments for the digital generation are depicted in FIGS. 8, and 10–12. FIG. 10 illustrates another embodiment for digitally generating a modulated signal. In this approach, a digitally generated modulated signal generator 780 is comprised of a modulated signal digital generator 782 and an optional up-convertor 784. In this embodiment, the modulated signal generator provides significant advances over analog signal generators by providing enhanced phase stability over time and improved modulation control which results in lower compression sidelobes and improved detection algorithms.

Figure 11:
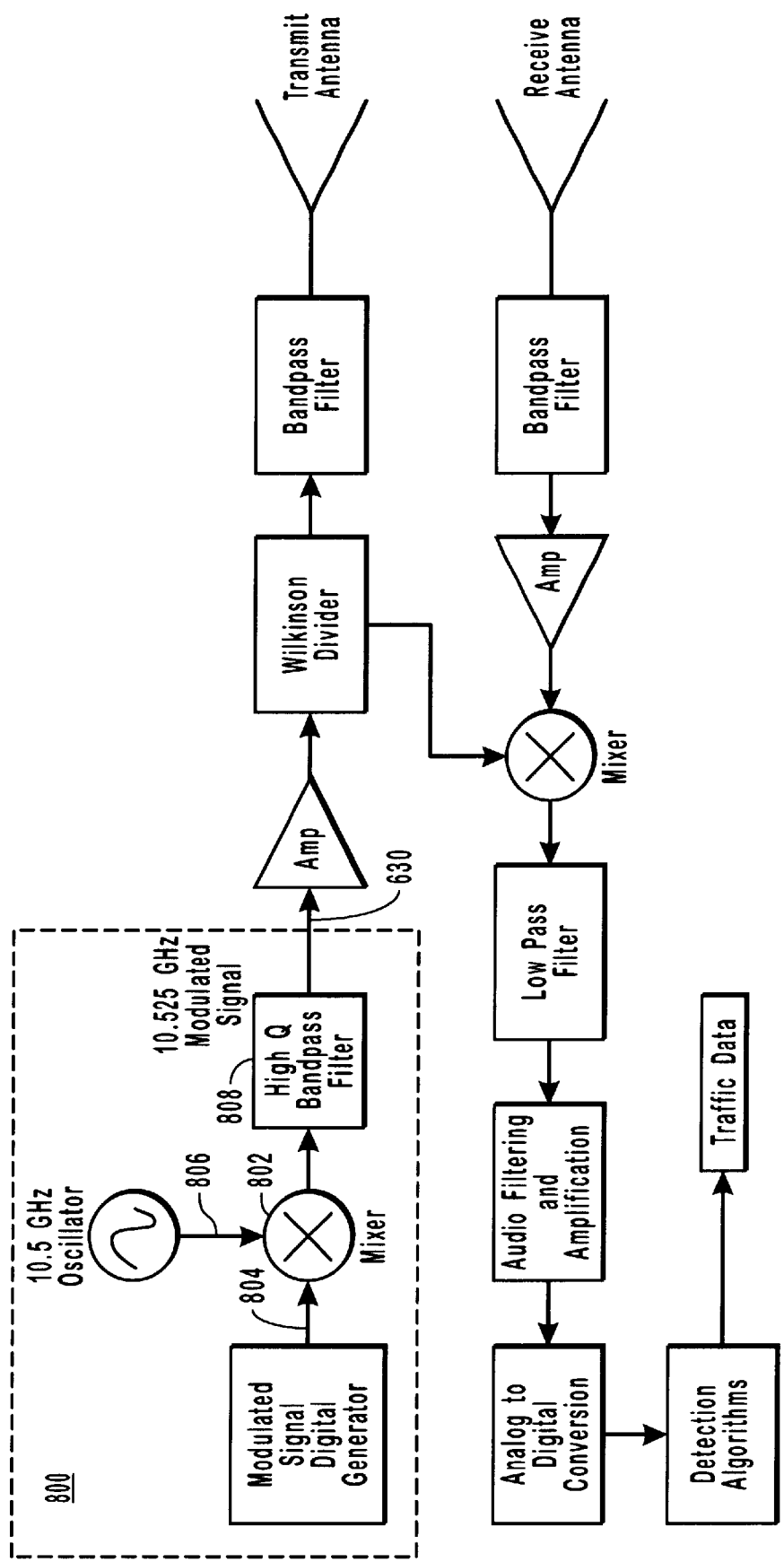
FIG. 11 illustrates an embodiment employing a mixer configuration for the digitally generated modulated signal generator, in accordance with an embodiment of the present invention.

FIG. 11 illustrates another digitally generated modulated signal generator 800. This embodiment illustrates up-converting a digitally generated modulated signal by using a frequency mixer 802. In this approach, the modulated signal 804 is mixed with an RF tone 806 resulting in a signal containing frequencies of the sum and difference of the tone and the original signal. Only the sum or the difference frequencies are desired and one or the other must be filtered out by a filter 808. For example, the digitally modulated signal generator produces a signal ranging from 100 MHz to 150 MHz. This signal is then mixed with a 10.4 GHz tone. The resulting signal contains copies of the digitally generated modulated signal in the 10.3 GHz to 10.25 GHz range and in the 10.5 to 10.55 GHz ranges. A band pass filter 808 with a high Q can be used to filter the lower frequency copy and the higher frequency copy is then transmitted.

Figure 12:
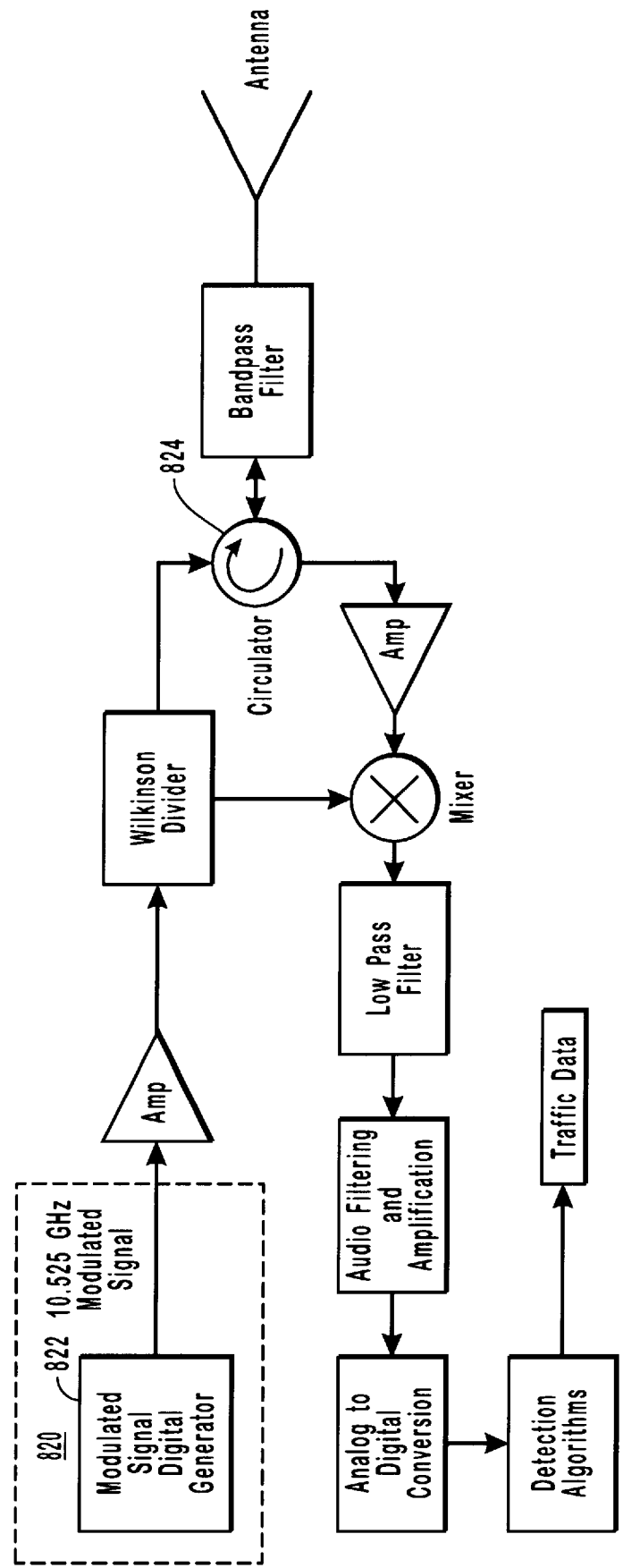
FIG. 12 illustrates direct digital signal generation of the transmit signal, in accordance with another embodiment of the present invention.

FIG. 12 illustrates a specific embodiment for digitally generating a modulated signal wherein the digitally generated modulated signal generator 820 is comprised of a direct digital to analog conversion generator 822 capable of direct generation of the desired signal. FIG. 12 further illustrates another implementation of the transmit and receiver portions wherein they share a single antenna that is multiplexed using a circulator 824 for alternating between transmit and receive modes of operation.

Each of these embodiments comprises similar additional components and the preferred embodiment as illustrated in FIG. 8 is used to describe and define those components. In the preferred embodiment as illustrated in FIG. 8, reference signal 612 sweeps in frequency from 10.5 megahertz to 10.55 megahertz and is generally linear with a duration of 1.25 milliseconds followed by recovery time.

The output of DDS 606 couples to a phase lock loop 608 which operates by comparing two input frequencies 612, 614 and generates a voltage 616 which controls a voltage controlled oscillator (VCO) 610. Regarding phase lock loop 608, if the reference signal 612 is lower in frequency than the pre-scaler output 614, then the output voltage 616 of phase lock loop 608 becomes lowered. Conversely, if reference signal 612 is higher than pre-scaler output 614, then output voltage 616 of phase lock loop 608 is increased.

VCO 610 outputs a signal 618 whose frequency is determined by the input voltage 616. Those of skill in the art appreciate that the higher the input voltage of input 616, the higher the frequency of the RF signal output 618, and conversely, the lower input voltage 616, the lower the frequency of the RF output signal 618. In a "reverse" drive VCO a change in input voltage yield the opposite result just described. By way of example and not limitation, the VCO 610 of the present embodiment generates an output signal in the 5.25 GHz to 5.275 GHz range.

Transmit portion 602 is further comprised of a pre-scaler 620 which operates as a frequency divider by reducing the frequency of VCO 610 by a factor of, for example, 4. Before comparing the two signals, the PLL further divides the signal by a factor of 250 which results in a signal in the 10.5 MHz to 10.55 MHz range, which range is near the same frequency as reference signal 612 as output by DDS 606. Thus, output signals 612, from the direct digital synthesizer and pre-scaler output 614 become tracking signals for comparison by phase lock loop 608. In general, phase lock loop 608 adjusts input voltage 616 to VCO 610 until both inputs, reference signal 612 and pre-scaler output 614, are at the same frequency. As referenced signal 612 from DDS 606 increases in frequency, phase lock loop 608 drives VCO 610 in such a manner as to also increase the frequency. Thus, output signal 618 from VCO 610 results in the same signal as reference signal 612 other than signal 618 is scaled, in the present example, by a factor of 500.

Transmitter portion 602 further includes a Wilkinson divider 622 for dividing the RF signal 618 into two paths while maintaining isolation between the two outputs, output 624 and output 626. Those of skill in the art appreciate that Wilkinson divider 622 is a splitter in which each output path is reduced by half or 3 dB from input signal 618.

Transmitter portion 602 further includes a doubler 628 for receiving signal 624 and generating a signal 630. Doubler 628 operates as a nonlinear device for effectively doubling the frequency from input signal 624 to output signal 630. In the present example, input signal 624 operates between 5.25 GHz and 5.275 GHz generating an output 630 ranging from 10.5 GHz to 10.55 GHz. Therefore, signal 630, in the present example, results in a multiplication of reference signal 612 by a factor of 1,000.

Transmitter portion 602 further includes an amplifier 632 for coupling with signal 630 and for generating signal 634. Amplifier 632 provides gain control of the signal for boosting the signal to a level sufficiently large for transmission. Amplifier 632 further couples to a Wilkinson divider 636 for partitioning a portion of the transmission power to the receiver portion through a signal 638 and Wilkinson divider 636 further generates an output 640 for passing to band pass filter 642. Those of skill in the art appreciate that that pass band filter 642 filters the output signal on the transmit portion to reduce transmissions outside of the desired frequency band. Transmit portion 602 further includes a transmit antenna 644 further described below for emanating the signals generated by the aforementioned circuitry.

Received portion 604 is comprised of various components for receiving reflected signals as emanated by transmit portion 602. Reflected signals are received by receive antenna 650 and processed by a bandpass filter 652 which reduces transmission outside of the desired frequency band. The receive filtered signal 654 is thereafter passed to amplifier 656 which generally is implemented as a low noise amplifier for boosting the received signal to a more useable level for processing.

Amplified signal 658 and signal 638 are received by mixer 660 which, in the present example, is implemented as a nonlinear device that effectively multiplies the two input signals to produce output signal 662. Those of skill in the art appreciate that mixers operate, for example, by receiving two sinusoidal signals which may be of different frequencies which results in an output signal having the characteristics of the sum of the two input sinusoidal signals, which trigonometrically results in a first frequency corresponding to the sum of the two input frequencies and a second frequency corresponding to the difference of the two input frequencies. This principle is illustrated by the trigonometric identity:

$$\sin\alpha\cos\beta = \frac{1}{2}[\sin(\alpha-\beta) + \sin(\alpha+\beta)]$$

Thus, if one input signal is 10.5 GHz and a second is 10.50001 GHz then the output signal from the mixer will be the sum of the sinusoids at 21.00001 GHz and another at 10 KHz for the present exemplary implementation, the resulting difference frequency signal is employed for evaluation of the signal characteristics.

It should be appreciated that the utilization of the difference frequency is a result of ranging capabilities of a linearly sweeping transmitted frequency. For example, the present embodiment utilizes a signal transmitted that is linearly frequency modulated (e.g. chirp). If the transmitted signal is reflected by a single point source target and is received by the radar and mixed with the same linearly modulated signal, the received signal, which has been delayed in time by the propagation duration to and from the target results in a frequency difference between the two inputs to the mixer since the transmitted signal exhibits a constantly increasing frequency during the phase of the period under evaluation. Therefore, the longer the propagation time to and from the target in question, the larger the frequency difference between the presently transmitted and the received signal. For example, in the present illustration, the linearly increasing frequency increases at a rate of 50 MHz in 1.25 milliseconds. Such a linear change in frequency results in a 40 GHz per second change in frequency. Therefore, if a target is located at a distance of 100 feet, the propagation time to and from the target is approximately 203 nanoseconds. In that length of time, the transmit frequency would have changed by 8.13 KHz.

Received portion 604 is further comprised of a low pass filter 664 which eliminates undesired RF signals from the mixer output, therefore resulting in audio frequencies being present at signal 666. Therefore, signal 666, which is the output of the low pass filter 664, is an audio frequency signal whose frequency corresponds to the range of the target and whose amplitude corresponds to the reflectiveness of the target.

Receiver portion 604 further includes audio filtering and amplification as illustrated in block 668. Such filtering and amplification conditions the signal prior to digitization to reduce any feed-through from the transmitting antenna directly coupling to the receiving antenna. Signal conditioning in the form of high pass filtering is employed since transmitter coupling appears in the received signal as a low frequency.

The following digital circuitry components may reside on a separate digital board. The output condition signal 670 is input to analog-to-digital conversion for 672, which converts the audio frequency signal to a digital signal for processing and analysis. The digitized output signal 674 is thereafter processed by detection algorithm 676, which performs spectral analysis on the digitized signal 674 and generates the desired traffic statistics for use in traffic analysis, control, and forecasting. Other processing within detection algorithm 676 include automatic and continuous background estimation, automatic and continuous lane allocation and automatic and continuous detection threshold determination.

Figure 9:
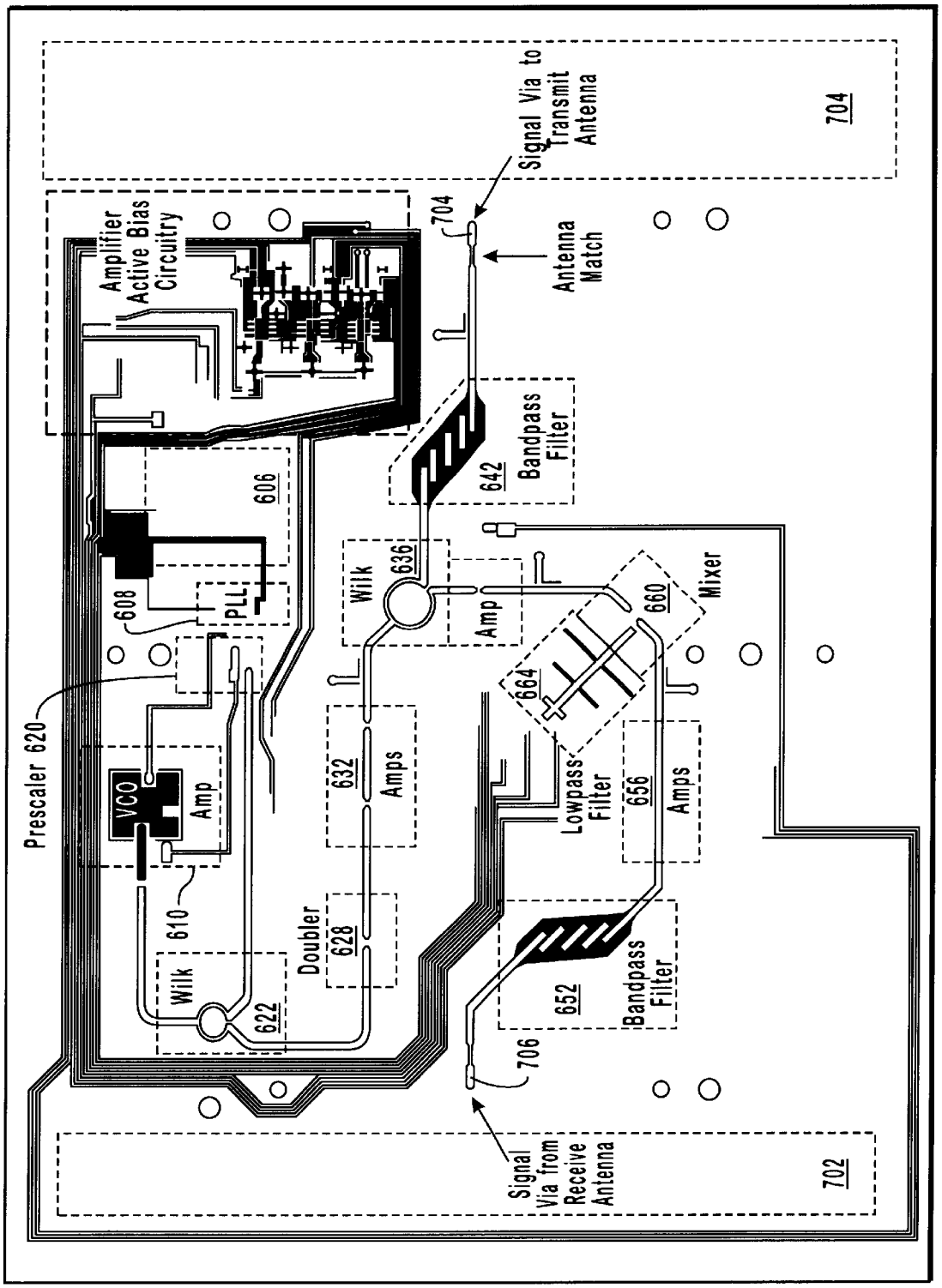
FIG. 9 is a detailed layout of the RF component side of the RF component side of the RF board, in accordance with the preferred embodiment of the present invention.

FIG. 9 illustrates a typical layout of the RF component side of the RF circuit board, in accordance with the preferred embodiment of the present invention. As discussed, RF components 522 (FIG. 5) are populated on side 524. The transmit portion 602 and receive portion 604 are depicted, absent antennas 570 and 572 which populate the other side of the board. The conductor backed dielectric substrates 704 and 702 for the antenna structures are depicted in FIG. 9. Also depicted in FIG. 9 are the signal via to the transmit antenna 704 and the signal via from the receive antenna 706.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sensor for monitoring vehicles on a roadway comprising:
    a multi-layer radio frequency circuit board for transmitting modulated radio frequency signals and for receiving reflections of the modulated radio frequency signals from said vehicles on said roadway, said multi-layer radio frequency circuit board having a first side for disposing radio frequency components thereon and a second side having a planar antenna disposed thereon, wherein the radio frequency components include a digital signal generator that digitally generates the modulated radio frequency signals; and
    at least one signal processing circuit board having a first side for disposing signal processing components thereon and a second side having an electrically conductive ground layer, said second side of said at least one signal processing board oriented in parallel with and facing said multi-layer radio frequency circuit board.

2. The sensor, as recited in claim 1, wherein said planar antenna comprises a plurality of series-configured loop elements arranged in a tapered array.

3. The sensor, as recited in claim 2, wherein said planar antenna comprises at least a pair of tapered arrays.

4. The sensor as recited in claim 1, wherein said digital signal generator further comprises
    a direct digital synthesizer for generating a low frequency waveform for a transmitter of said sensor.

5. The sensor, as recited in claim 1, further comprising:
an RF absorber assembled between said first side of said radio frequency circuit board having said radio frequency components thereon and said second side of said at least one signal processing board having said electrically conductive ground layer thereon.

6. The sensor, as recited in claim 1, further comprising a housing for enclosing said multi-layer radio frequency circuit board and said at least one signal processing board therein.

7. The sensor, as recited in claim 6, wherein said housing for enclosing said multi-layer radio frequency circuit board and said at least one signal processing board therein is configured as a planar housing surrounding said multi-layer radio frequency circuit board and said at least one signal processing board therein.

8. The sensor, as recited in claim 7, wherein said planar housing further comprises a radome integrated into said planar housing and located adjacent to said planar antenna on said radio frequency circuit board.

9. An above-ground traffic sensor for detecting vehicles traveling on a roadway, the traffic sensor comprising:
a radio frequency circuit board including:
a transmit portion that includes:
a digitally generated modulated signal generator that digitally generates a signal that is transmitted by a transmitter towards vehicles traveling on a roadway; and
a receiver portion that detects a reflected signal from the vehicles traveling on the roadway and that generates a data signal that represents traffic data from the reflected signal.

10. The above-ground traffic sensor, as recited in claim 9, wherein said digitally generated modulated signal generator comprises:
a direct digital synthesizer for generating a low frequency waveform for said transmitter;
a phase lock loop coupled to said direct digital synthesizer for tracking said low frequency waveform; and
a voltage controlled oscillator coupled to said phase lock loop for generating a modulated transmit signal.

11. The above-ground traffic sensor, as recited in claim 9, wherein said digitally generated modulated signal generator comprises:
a digitally modulated signal generator for generating a modulated signal;
an oscillator for generating an RF tone; and
a frequency mixer for mixing said modulated signal and said RF tone to form a signal comprises of sum and difference frequencies.

12. The above-ground traffic sensor, as recited in claim 9, wherein said digitally generated modulated signal generator comprises:
a direct digital to analog converter for directly generating a modulated signal at RF frequencies.

13. The above-ground traffic sensor, as recited in claim 9, wherein said radio frequency circuit board further comprises a planar antenna disposed thereon for transmitting said signal and for receiving reflections of said signal.

14. The above-ground traffic sensor, as recited in claim 13 wherein said planar antenna comprises of a plurality of series-configured loop elements arranged in a tapered array.

15. The above-ground traffic sensor, as recited in claim 14, wherein said planar antenna comprises at least a pair of said tapered arrays.

16. An above-ground traffic sensor for detecting vehicles traveling on a roadway, comprising:
planar antennas mounted in a planar circuit board for propagating a transmit signal toward vehicles on a roadway and for receiving said transmit signal reflected from said vehicles, wherein the planar antennas further comprises:
at least one coplanar loop series-fed array antenna on the planar circuit board.

17. The above-ground traffic sensor, as recited in claim 16, wherein said at least one coplanar loop series-fed antenna comprises:
a first coplanar loop series-fed array antenna that propagates said transmit signal toward said vehicles on said roadway; and
a second coplanar loop series-fed array antenna that receives said transmit signal reflected from said vehicle.

18. The above-ground traffic sensor, as recited in claim 17, wherein said first coplanar loop series-fed array antenna and said second coplanar loop series-fed array antenna include loop elements arranged in tapered arrays.

19. The above-ground traffic sensor, as recited in claim 17, wherein said at least one coplanar loop series-fed array antenna each comprises at least a pair of tapered arrays.

20. A radar-based vehicular traffic sensor, comprising:
a digital signal generator that digitally generates a modulated electromagnetic signal;
transmitter electronic components for transmitting the modulated electromagnetic signal at a vehicle on a roadway;
receiver electronic components for receiving the modulated electromagnetic signal reflected from the vehicle on the roadway; and
at least one planar loop series-fed array antenna for transmission and/or reception of said modulated electromagnetic signal, wherein each at least one planar loop series-fed array antenna includes a plurality of loops, each loop having a height that is different from other loops in the plurality of loops.

21. A radar-based vehicular traffic sensor, as recited in claim 20, wherein the digital signal generator further comprises one or more of:
a direct digital synthesizer that generates a modulated electromagnetic signal that sweeps in frequency; and
a modulated signal digital generator for generating a modulated electromagnetic signal that is up converted using a frequency mixer.

22. A sensor for monitoring vehicles on a roadway, the sensor comprising:
a transmit portion comprising:
a digital signal generator that digitally generates a modulated signal; and
a transmit antenna for transmitting the modulated signal towards vehicles on a roadway;
a received portion comprising:
a receive antenna for receiving reflections of the modulated signal from vehicles on the roadway, wherein the reflections of the modulated signal are processed to produce traffic data representing the vehicles on the roadway.

23. A sensor as defined in claim 22, wherein the transmit antenna and the receive antenna are the same antenna used at different times to either transmit the modulated signal or to receive the reflections of the modulated signal.

24. A sensor as defined in claim 22, wherein the transmit antenna is a first array of series fed coplanar loop elements and wherein the receive antenna is a second array of series fed coplanar loop elements.

26. A sensor as defined in claim 22, wherein the digital signal generator further comprises at least one of:
   a direct digital synthesizer that is coupled with a phase locked loop;
   a modulated signal digital generator and an up-converter; and
   a direct digital to analog conversion generator that produces the modulate signal.

26. An above-ground traffic sensor for detecting vehicles traveling on a roadway, comprising:
   planar antennas mounted in a planar circuit board for propagating said a transmit signal toward said vehicles on said a roadway and for receiving said transmit signal reflected from said vehicles, wherein the planar antennas further comprises:
   at least one coplanar loop series-fed array antenna on the planar circuit board, wherein each at least one coplanar loop series-fed array antenna is terminated by a short circuited transmission line.

27. The above-ground traffic sensor, as recited in claim 26, wherein each coplanar loop series-fed array antenna includes a tapered array that includes a plurality of loops, wherein the plurality of loops are configured to generate a radiation pattern with low side lobes.

* * * * *

UNITED STATES PATENT AND TRADEMARK OFFICE
CERTIFICATE OF CORRECTION

PATENT NO. : 6,693,557 B2
DATED : February 17, 2004
INVENTOR(S) : David V. Arnold et al.

It is certified that error appears in the above-identified patent and that said Letters Patent is hereby corrected as shown below:

Title page,
Item [75], Inventors, change "Linden, UT" to -- Lindon, UT -- after "Logan Harris" and "Micheal Jenson"

Column 1,
Lines 7-8, delete "(Attorney Docket No. 15455.1)"

Column 2,
Line 16, insert -- , thereby -- after "being monitored"
Line 29, change "user defined" to -- user-defined --

Column 3,
Line 2, change "colocated" to -- co-located --
Line 22, delete "," after "illustrated"

Column 5,
Line 13, insert -- and -- after "interconnect lines 574"
Line 14, insert --, -- after "networks 576"
Lines 31 and 35, change "series fed" to -- series-fed --

Column 6,
Line 6, insert --, -- after "60 mils."
Line 16, insert -- . -- after "25 mil"

Column 7,
Line 21, insert -- . -- after "waveforms"
Lines 64-65, insert -- , -- before "as illustrated in FIG. 8"

Column 8,
Line 18, insert -- , -- after "VCO"
Line 18, change "yield" to -- yields --
Line 18, insert -- of that -- after 'opposite result"
Line 45, change "half or 3 dB" to -- half, or 3dB, --

Column 10,
Line 16, change "include" to -- includes --

Column 11,
Line 49, change "comprises" to -- comprised --.
Line 61, delete "of" after "comprises"

UNITED STATES PATENT AND TRADEMARK OFFICE
CERTIFICATE OF CORRECTION

PATENT NO. : 6,693,557 B2
DATED : February 17, 2004
INVENTOR(S) : David V. Arnold et al.

It is certified that error appears in the above-identified patent and that said Letters Patent is hereby corrected as shown below:

<u>Column 12,</u>
Line 5, change "comprises:" to -- comprise: --
Line 67, change "series fed" to -- series-fed --

<u>Column 13,</u>
Line 1, change "series fed" to -- series-fed --
Line 14, delete "said" after "propagating"
Line 14, change "said vehicles" to -- the vehicles --

<u>Column 14,</u>
Line 1, change "said a roadway" to -- the roadway --
Line 7, change "short circuited" to -- short-circuited --

Signed and Sealed this

Seventeenth Day of August, 2004

JON W. DUDAS
*Acting Director of the United States Patent and Trademark Office*